United States Patent
Mitchell et al.

(10) Patent No.: US 7,090,946 B2
(45) Date of Patent: Aug. 15, 2006

(54) COMPOSITE ELECTRODE AND METHOD FOR FABRICATING SAME

(75) Inventors: Porter Mitchell, San Diego, CA (US); Xiaomei Xi, Carlsbad, CA (US); Linda Zhong, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/916,936

(22) Filed: Aug. 12, 2004

(65) Prior Publication Data

US 2005/0186473 A1   Aug. 25, 2005

Related U.S. Application Data

(60) Provisional application No. 60/578,722, filed on Jun. 10, 2004, provisional application No. 60/557,576, filed on Mar. 30, 2004, provisional application No. 60/546,093, filed on Feb. 19, 2004.

(51) Int. Cl.
*H01M 4/58* (2006.01)
*H01M 4/62* (2006.01)

(52) U.S. Cl. ............ 429/231.8; 429/217; 429/218.1; 429/232

(58) Field of Classification Search ......... 429/217, 429/218.1, 231.8, 232, 209
See application file for complete search history.

(56) References Cited

U.S. PATENT DOCUMENTS

| | | | |
|---|---|---|---|
| 5,162,178 A | * | 11/1992 | Ohsawa et al. ............ 429/213 |
| 5,198,313 A | | 3/1993 | Juergens |
| 5,707,763 A | * | 1/1998 | Shimizu et al. ............ 429/217 |
| 5,849,431 A | | 12/1998 | Kita et al. |
| 5,879,836 A | * | 3/1999 | Ikeda et al. ............ 429/231.8 |
| 6,127,474 A | | 10/2000 | Andelman |
| 6,310,756 B1 | | 10/2001 | Miura et al. |
| 6,359,769 B1 | | 3/2002 | Mushiake et al. |
| 6,589,299 B1 | | 7/2003 | Missling et al. |
| 6,697,249 B1 | | 2/2004 | Maletin et al. |
| 2002/0039275 A1 | | 4/2002 | Takeuchi et al. |
| 2002/0122985 A1 | | 9/2002 | Sato et al. |
| 2002/0167784 A1 | | 11/2002 | Takatami et al. |
| 2003/0157314 A1 | | 8/2003 | Penneau et al. |

OTHER PUBLICATIONS

Patent Abstracts of Japan, JP05-129020(Sony Corp.), May 25, 1993, abstract and paragraphs [0006]-[0009], Figures 1 and 2.

* cited by examiner

*Primary Examiner*—Patrick Joseph Ryan
*Assistant Examiner*—Thomas H. Parsons
(74) *Attorney, Agent, or Firm*—Hensley Kim & Edgington LLC

(57) ABSTRACT

Composite electrodes are constructed with pressure-bonding techniques instead of an adhesive. A current collector is made from aluminum foil roughed on both surfaces. The surfaces of the collector can be treated to enhance adhesion to the surfaces. Layers of film that includes active electrode material, such as activated carbon, are fabricated and pressure-bonded to the current collector using a calender with heated rollers. The resulting composite sheet is then processed to shape electrodes, which can be used in electrical energy storage devices, including double layer capacitors.

12 Claims, 4 Drawing Sheets

COMPOSITE ELECTRODE AND METHOD FOR FABRICATING SAME

RELATED APPLICATIONS

This Application is related to and claims priority from commonly assigned U.S. Provisional Application Ser. No. 60/557,576, filed 30 Mar. 2004, which is incorporated herein by reference; and This Application is related to and claims priority from commonly assigned U.S. Provisional Application Ser. No. 60/578,722, filed 10 Jun. 2004, which is incorporated herein by reference; and This Application is related to and claims priority from commonly assigned U.S. Provisional Application Ser. No. 60/546,093, filed 19 Feb. 2004, which is incorporated herein by reference.

FIELD OF THE INVENTION

The present invention relates generally to fabrication of electrodes, and, more specifically, to fabrication of composite electrodes for electrical energy storage devices, such as double layer capacitors.

BACKGROUND

Electrodes are widely used in many devices, for example, primary (non-rechargeable) battery cells, secondary battery cells, fuel cells, and capacitors. Electrodes are typically constructed using two or even more constituent materials. These electrodes are known as composite electrode. One application where composite electrodes are often used is construction of double layer capacitors, which are also known as electrochemical capacitors, supercapacitors, and ultracapacitors.

Double layer capacitors employ electrodes immersed in an electrolytic solution as their energy storage element. Typically, a porous separator soaked in the electrolyte ensures that the electrodes do not come in contact with each other. A double layer of charges is formed at the interface between the solid electrodes and the electrolyte. (Double layer capacitors owe their descriptive name to these layers.) When electric potential is applied between a pair of electrodes, ions that exist within the electrolyte are attracted to the surfaces of the electrodes, and migrate towards the electrodes. A layer of oppositely-charged ions is thus created and maintained near each electrode surface. The electrical energy is stored in the charge separation layers between the ionic layers and the charge layers at the corresponding electrode surfaces. The charge separation layers behave essentially as capacitors.

Additional energy can also be stored in the double layer capacitors because of orientation and alignment of molecules of the electrolytic solution under influence of the electric potential.

In comparison to conventional capacitors, double layer capacitors have high capacitance in relation to their volume and weight. There are two main reasons for this volumetric and weight efficiency. First, the width of the charge separation layers is very small, on the order of nanometers. Second, the electrodes can be made from a porous material, having very large area per unit volume. Because capacitance is directly proportional to the electrode area, and inversely proportional to the width of the charge separation layer, the combined effect of the narrow charge separation layer and large surface area results in a capacitance that is very high in comparison to that of conventional capacitors. High capacitance of the double layer capacitors allows the capacitors to receive, store, and release large supplies of electrical energy.

Another important performance parameter of a capacitor is its internal resistance. Frequency response of a capacitor depends on the characteristic time constant of the capacitor, which is essentially a product of the capacitance and the internal resistance, or RC. To put it differently, internal resistance limits both charge and discharge rates of a capacitor, because the resistance limits the current that flows into or out of the capacitor. Maximizing the charge and discharge rates is important in many applications. In automotive applications, for example, a capacitor that is used as the energy storage element that powers a vehicle's engine has to be able to provide high instantaneous power during acceleration, and to receive bursts of power produced by regenerative braking. In internal combustion-powered vehicles, the capacitor periodically powers a vehicle's starter, also requiring high power in relation to the size of the capacitor.

The internal resistance also creates heat during both charge and discharge cycles. Heat causes mechanical stresses and speeds up various chemical reactions, thereby accelerating capacitor aging. It is therefore desirable to reduce internal resistance of capacitors. Moreover, the energy converted into heat is lost, decreasing the efficiency of the capacitor.

Active materials used for electrode construction—activated carbon, for example—usually have rather limited specific conductance. Thus, large contact area may be desired to minimize the contact resistance between the electrode and its terminal. The active material may also be too brittle or otherwise unsuitable for directly connecting to terminals. Additionally, the material may have relatively low tensile strength, needing mechanical support in some applications. For these reasons, electrodes incorporate current collectors.

A current collector is typically a sheet of conductive material on which the active electrode material is deposited, either directly or over one or more intermediate layers. Often, aluminum foil is used as the current collector material of a composite electrode. In one electrode fabrication process, a film that includes activated carbon powder (i.e., the active electrode material) is produced, and then attached to a thin aluminum foil using an adhesive. The use of the adhesive improves bonding of the active electrode material to the current collector. Unfortunately, this process also has a number of disadvantages.

First, the adhesive increases the cost of materials consumed in the process of electrode fabrication; some adhesives are quite expensive.

Second, two steps are added to the fabrication process. The adhesive must be applied onto the current collector foil, or onto the active electrode film. The adhesive must also be allowed to dry and cure. These extra steps increase the cost of the final product.

Third, the adhesive may deteriorate with time, contributing to an increase in the internal resistance of the electrode. In some double layer capacitors, for example, the electrolyte reacts chemically with the adhesive, causing the adhesive to weaken and the bond created by the adhesive to fail.

Fourth, adhesive use reduces the energy storage efficiency of the electrode, because the adhesive penetrates into the pores of the active electrode material, decreasing the total surface active area of the electrode. Therefore, it would be preferable to reduce or eliminate the use of adhesives in compound electrodes.

A need thus exists for methods for fabricating compound electrodes without the use of adhesives at the interface between the active electrode material and the current collector. A further need exists for electrodes fabricated without the use of adhesives at this interface. Still another need exists for energy storage devices with electrodes without adhesive on the interfaces between the active layers and the current collectors.

SUMMARY

The present invention is directed to electrodes and processes for manufacturing electrodes that satisfy these needs. An exemplary embodiment of the invention herein disclosed is a composite electrode with a current collector and two film layers of active electrode material. The current collector is a conductive foil, for example, aluminum foil 20–50 microns in thickness. The film layers include active electrode material, such as activated carbon particles. The current conductor is sandwiched between the two films of the active electrode material, and the assembly of the current collector and the two films is processed in a high-pressure, high-temperature nip, for example, a calender. Processing in the high-pressure, high-temperature nip causes the film layers to pressure-bond and adhere to the current collector. No adhesive is used at the surfaces of the current collector and at the surfaces of the two films that are adjacent to the current collector. To promote the adhesion between the two films and the current collector further, the surfaces of the current collector can be subjected to an roughening and/or activation treatment, such as corona treatment, before processing in the high-pressure and high-temperature nip.

In one embodiment, an electrode comprises a current collector comprising a first surface and a second surface, and a first film of active electrode material, the first film comprising a third surface adjacent to the first surface of the current collector, the third surface of the first film being attached directly to the first surface of the current collector substantially without use of an adhesive layer between the first and the third surfaces. The current collector may comprise a conductive material. A volumetric porosity surface factor of the first material may be about $7.5*10^7$ $m^{-1}$ or greater. The first film of active electrode material may comprise carbon and binder. The first film of active electrode material may comprise dry fibrillized carbon and binder particles. A volumetric macroporosity of the first active electrode material may be between about 40 percent and about 80 percent. A majority of pores in the first active electrode material may range in size between about 1 and about 3 cubic micrometers. A first surface may comprise portions defining protrusions, wherein majority of the protrusions range in area between about 0.5 and about 5 square micrometers as measured at 0.5 micrometer elevation from average level of the first surface. A plurality of protrusions may penetrate pores at the third surface of the first film, causing the first surface of the current collector to adhere to the third surface of the first film. The first surface of the current collector may comprise portions defining pits, wherein majority of the pits range in surface area between about 0.5 and about 8 square micrometers, surface area of each pit being measured at average level of the first surface. The first surface of the current collector may be chemically pitted. The first surface of the current collector may be corona treated to promote adhesion between the first surface of the current collector and the third surface of the first film. The first surface of the current collector may be treated with active plasma to promote adhesion between the first surface of the current collector and the third surface of the first film. The first surface of the current collector may be mechanically roughed to cause the first surface to be uneven.

In one embodiment, an energy storage device comprises a current collector comprising a first surface and a second surface, the first surface of the current collector being uneven; and a first film of active electrode material, the first film comprising a third surface adjacent to the first surface of the current collector, the third surface of the first film being attached directly to the first surface of the current collector; wherein the first and third surfaces are bonded directly to each other causing the first surface to adhere to the third surface. The first film of active electrode material may comprise dry fibrillized carbon and binder particles. The current collector and the first film of active electrode material may be configured to comprise a double-layer capacitor electrode. The electrode may comprise a double-layer capacitor electrode. The first film of active electrode material may be attached to the current collector as a self-supporting film. The device may further comprise a second film of active electrode material, the second film comprising a fourth surface adjacent to the second surface of the current collector, the fourth surface of the second film being attached directly to the second surface of the current collector; wherein the fourth surface and the second surface are bonded directly to each other causing the fourth surface to adhere to the second surface. The first film and second film of active electrode material may comprise dry fibrillized carbon and binder particles, and wherein the device comprises an energy storage device.

In one embodiment, a method of manufacturing an electrode comprises providing a current collector comprising a first surface and a second surface; providing a first film of active electrode material comprising a third surface; providing a second film of active electrode material comprising a fourth surface; roughing the first and second surfaces of the current collector; bringing the first surface in direct contact with the third surface; bringing the second surface in direct contact with the fourth surface; and pressing the first film, the current collector, and the second film together to cause the first surface to adhere to the third surface, and the second surface to adhere to the fourth surface. The step of pressing may comprise a step of processing the first film, the current collector, and the second film in a calender to cause the first surface of the current collector to adhere to the third surface of the first film, and to cause the second surface of the current collector to adhere to the fourth surface of the second film. The calender may apply a pressure of about 250 or more pounds per linear inch on the first film, the current collector, and the second film. The step of pressing may comprise a step of processing the first film, the current collector, and the second film between a first roller and a second roller of a calender, and further comprise a step of heating at least one of the first and second rollers to a temperature of between about 100 degrees Celsius and about 300 degrees Celsius.

These and other features and aspects of the present invention will be better understood with reference to the following description, drawings, and appended claims.

DETAILED DESCRIPTION

Figure 1:
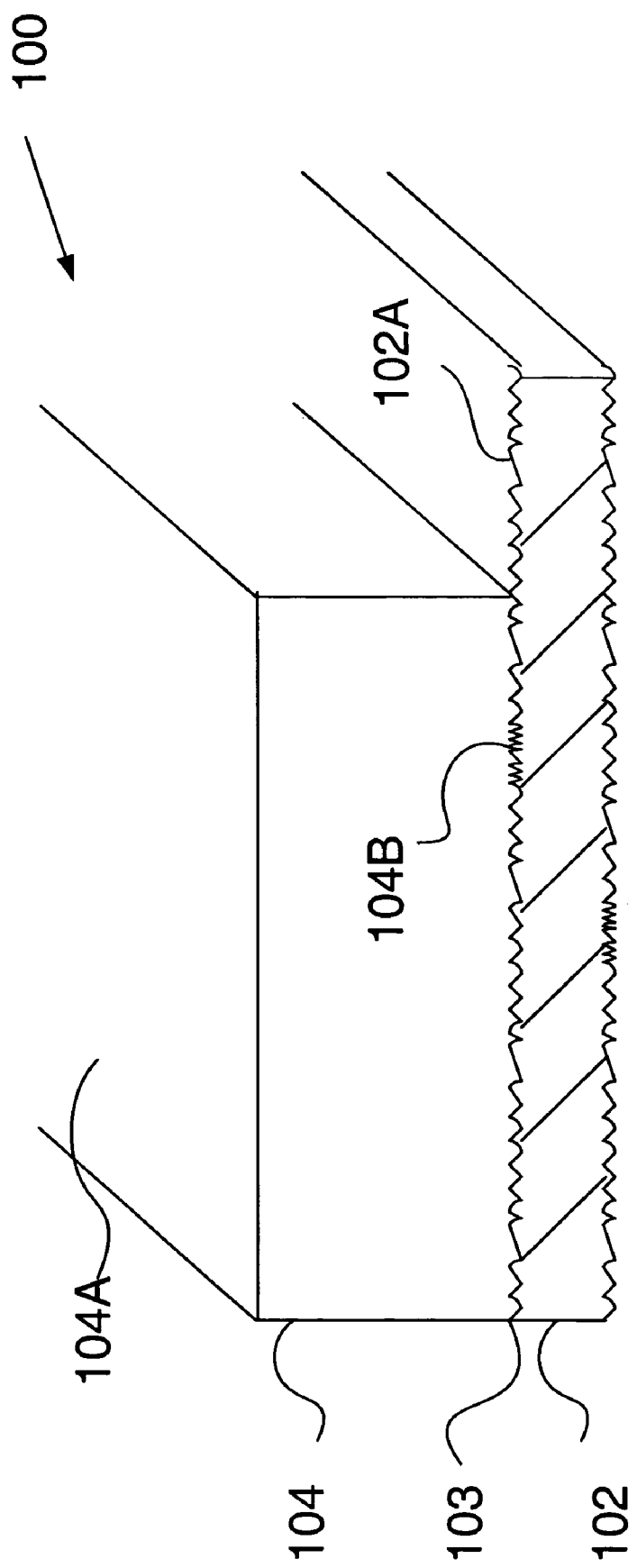
FIG. 1 is a high-level cross-sectional view of an electrode with a single film layer of active electrode material pressure-bonded to a current collector.

Reference will now be made in detail to several embodiments of the invention that are illustrated in the accompanying drawings. Wherever possible, same or similar reference numerals are used in the drawings and the description to refer to the same or like parts. The drawings are in a simplified form and not to precise scale. For purposes of convenience and clarity only, directional terms, such as top, bottom, left, right, up, down, over, above, below, beneath, rear, and front are used with respect to the accompanying drawings. These and similar directional terms should not be construed to limit the scope of the invention in any manner. In addition, the words binder and adhesive are used interchangeably, unless the difference is noted or made otherwise clear from the context.

Referring more particularly to the drawings, FIG. 1 is a simplified view of a cross-section of a composite electrode 100 in accordance with the present invention. The electrode 100 includes a current collector 102, and a film of active electrode material 104, which is disposed on the current collector 102. In the illustrated embodiment, the current collector 102 is a sheet of aluminum foil approximately 40 microns thick. In alternative embodiments in accordance with the present invention, the thickness of the foil is between about 20 and about 100 microns; in other, more specific embodiments, the thickness of the aluminum foil is between about 30 and about 50 microns. Moreover, other conductive materials can be used for the current collector 102, including, for example, silver, copper, gold, platinum, and palladium, as well as various alloys of these metals.

Note that the upper surface 102A of the current collector 102 is uneven and rough. In the illustrated embodiment, the unevenness of the surface 102A is a result of mechanical roughing. In alternative embodiments, the upper surface of the current collector is roughed and made uneven using other processes, for example, chemical pitting. In addition, the upper surface can be subjected to a surface activation treatment using, for example, corona discharge, active plasma, ultraviolet, laser, or high frequency treatment methods known to a person skilled in the appropriate art. The activation treatment may be used to promote adhesion between the upper surface 102A of the current collector 102 and the film 104. Indeed, in some electrode embodiments in accordance with the invention, the surface activation treatment also performs the function of roughing the surface 102A, or is applied instead of roughing the surface 102A.

While the extent of unevenness of the upper surface of the current collector varies greatly from one embodiment to another, it has been identified that the upper surface of the current collector of certain embodiments includes protrusions, with majority of the protrusions having area between about 0.5 and 5 square micrometers, as measured at an elevation of about 1 micrometer from the average level of the upper surface. It has also been identified that that the upper surface of the current collector of certain embodiments includes pits, with majority of the pits having area between about 0.5 and 8 square micrometers in the plane of the upper surface.

The film of active electrode material 104 has an upper surface area 104A, and a lower surface area 104B at an interface 103 between the film 104 and the current collector 102. By "active electrode material" we mean a material that enhances the function of the electrode 100 beyond simply providing a contact or reactive area approximately the size of the upper surface 104A. In a double layer capacitor electrode, for example, the film 104 includes particles with high porosity, so that the surface area of the electrode 100 exposed to an electrolytic solution in which the electrode 100 is immersed is increased well beyond the area of the upper surface 104A. The effective surface area of the electrode 100 becomes essentially a function of the volume of the film 104, rather than the area of the upper surface 104A. For simplicity, we define a volumetric porosity surface factor (VPSF) as the ratio between (1) the surface area of the electrode 100 exposed to the electrolytic solution (not including the surface area 104A), and (2) the volume of the film 104. For example, if the area of the surface 104A is equal to $A_s$, the total area of the film 104 exposed to the electrolyte is $(A_s+A_v)$, and the volume of the film 104 is V, then the volumetric porosity surface factor VPSF of the material of the film 104 is calculated according to the following formula:

$$VPSF = \frac{A_v}{V}.$$

In the embodiment of FIG. 1, the material of the film 104 includes activated carbon particles, conductive carbon particles, and binder. The material has a volumetric porosity surface factor greater than about $7.5*10^7$ m$^{-1}$. This means that an electrode with a film of active electrode material having VPSF=$7.5*10^7$ m$^{-1}$, thickness of 150 microns, and surface area $A_s$ of 10-by-10 centimeters will have an effective surface area of $A_{eff}=A_s+A_v=(0.1*0.1)*(1+150*10^{-6}*7.5*10^7)$m$^2$=0.01*(1+11,250)m$^2$=112.51 m$^2$, well in excess of the 100 cm$^2$ provided by the 10 cm-by-10 cm area $A_s$.

Porosity is another measure of the volumetric efficiency of the film 104 in creating surface area exposed to an electrolyte or to another reactant. In the present context, porosity means macroporosity, i.e., porosity on a large scale defined by the interstitial volume between particles. In some embodiments in accordance with the present invention, the active electrode material has porosity of between about 40 and about 80 percent. In certain more specific embodiments, the porosity of the active electrode material is between about 50 and about 70 percent, and the median pore size varies between about 1 and about 3 cubic micrometers.

The film 104 can be manufactured using both known and novel processes. One way to manufacture a film of active electrode material is using an extrusion process, which relies on fibrillation properties of certain polymers. The polymers used in electrodes in accordance with the present invention include polytetraflouroethylene (PTFE or Teflon®), polypropylene, polyethylene, co-polymers, and various polymer blends. The polymers act as a matrix for the active electrode material within the film.

To form the film, powders of the polymer, the active electrode material, and possibly other powder materials are dry-blended. In one exemplary embodiment, the powders and proportions used are as follows: 85–90 percent by weight of activated carbon (the active electrode material), 5–8 percent by weight of PTFE, and 2–10 percent by weight of conductive carbon (graphite, acting as a promoter of electrical conduction). Suitable activated carbon powders are available from a variety of sources, including Nuchar® powders sold by Westvaco Corporation of Stamford, Conn. Another exemplary embodiment contains 85–93 percent of activated carbon, 3–8 percent of PTFE, and 2–10 percent of conductive carbon. Yet another exemplary embodiment contains activated carbon and PTFE, and does not use conductive carbon.

The resulting compound is introduced, together with a solvent, into an extruder to fibrillate the blended material, creating a dough-like film. In one embodiment, the proportion of the powder compound to the solvent is about 80/20 by weight. The dough-like film is calendered one or more times to produce the film of active electrode material having desired thickness and density. Finally, the dough-like film is baked or otherwise dried to reduce the residual solvent within the film to an acceptable level, on the order of parts per million.

Another technique for manufacturing the film of active electrode material is disclosed in a copending commonly-assigned U.S. patent application Ser. No. 10/817,701, filed Apr. 2, 2004. which is incorporated herein by reference. According to this process, dry particles of active electrode material (activated carbon) are blended or otherwise mixed together with a binder particles (polymer such as PTFE) and a conduction promoter particles (conductive carbon) to form a dry powder material. The dry powder material is dry fibrillized using a non-lubricated high-shear techniques, which in one embodiment utilizes a jet mill as is known to those skilled in the art. The shear forces that arise during the dry fibrillizing process physically stretch the polymer particles, causing the polymer to form a network of fibers that bind the polymer to the conduction promoter and to the active particles, e.g., to the graphite and activated carbon particles. The dry fibrillized material is then fed into one or more high-pressure nips, such as roll mills, calenders, belt-presses, or flat plate presses to form a dry self-supporting electrode film. Because no liquid or solvent is used in this novel process, the electrode film is substantially free of impurities, which can act to degrade lifetime and performance of the electrode.

Figure 2:
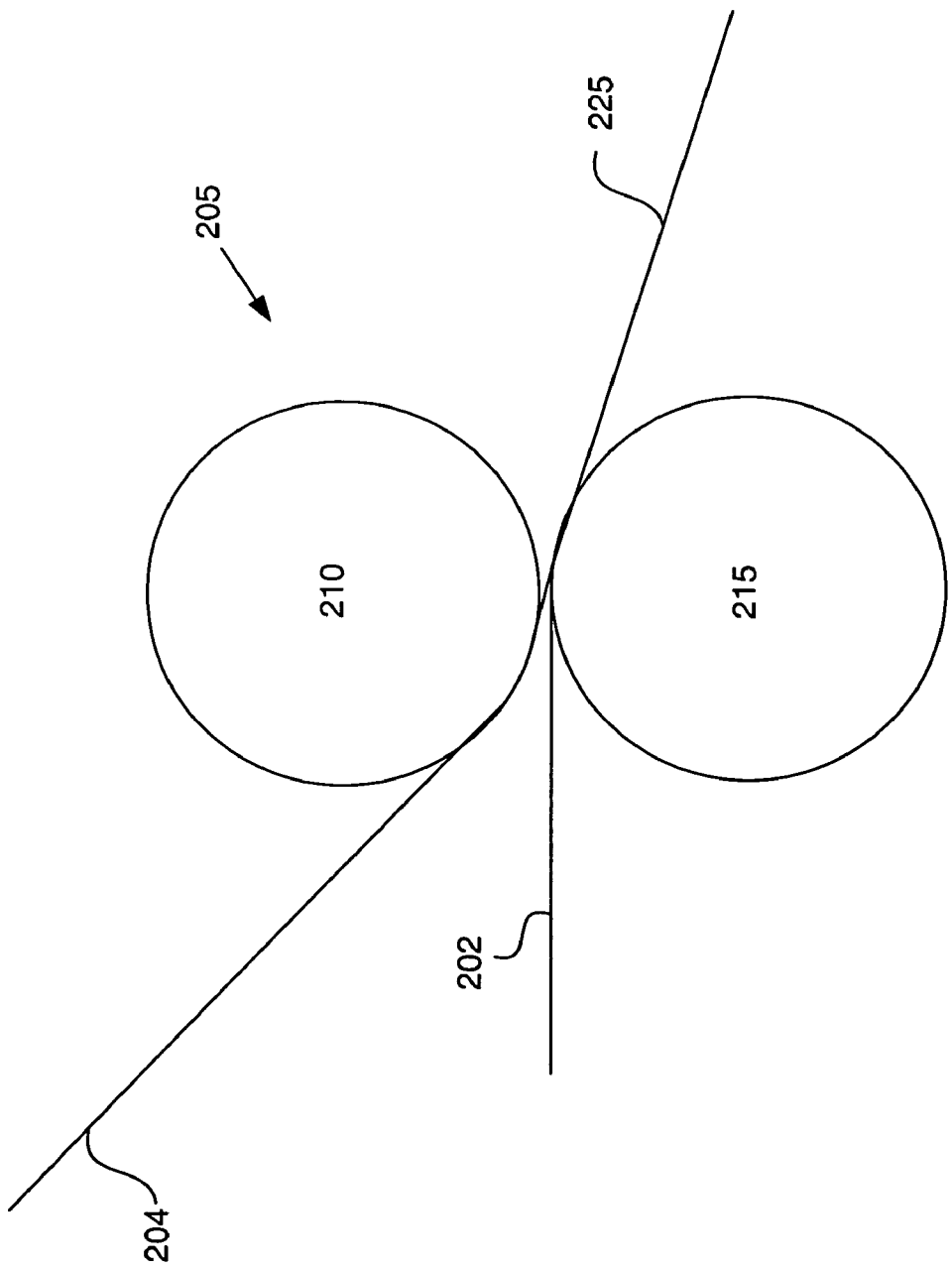
FIG. 2 illustrates selected steps of a process used for pressure-bonding the electrode of FIG. 1.

FIG. 2 illustrates bonding of a film 204 of active electrode material to a sheet of aluminum foil 202 in a calender 205. The film 204 and the aluminum foil 202 are fed between rollers 210 and 215 of the calender 205. Note that the film 204 is applied to the side of the foil 202 that has been roughed and activated, as has already been described. In the illustrated embodiment, the calender 205 is gap-controlled, meaning that the gap between the rollers 210 and 215 can be set to a predetermined distance. The calender compresses the foil 202 and the film 204, creating a pressure bond between the two layers and causing the two layers to adhere to each other, resulting in a composite sheet 225. Here, the thickness of the film 204 is between about 160 and about 180 microns, and the thickness of the foil 202 is about 40 microns. The gap of the calender 205 is set to between about 110 to about 120 microns. Because the aluminum foil 202 is substantially uncompressible, the calender compresses the film 204 by about 50 percent. Coming out of the calender, the film 204 expands, so that the more permanent reduction in its thickness is between about 5 and about 20 percent.

Note that adhesive is not applied to the surfaces of the foil 202 and the film 204 adjacent to each other, so that the interface between the two surfaces is substantially free of adhesives and the impurities they may comprise. In some embodiments in accordance with the present invention, adhesion between these components results mostly from the pressure bond created by the calender, the unevenness of the foil 202, and activation treatment of the foil 202. Specifically, the protrusions on the uneven surface of the foil 202 penetrate the pores of the film 204, interlocking with the film's porous structure and enhancing adhesion between the film 204 and the foil 202. Similarly, protrusions on the surface of the film 204 can penetrate into the pits on the surface of the foil 204, also enhancing the adhesion.

Other processes in accordance with the present invention employ pressure-controlled calenders. The pressure applied to the combination of the foil 202 and the film 204 is generally greater than about 250 pounds per linear inch (PLI). More specifically, the pressure applied is between about 500 and 2,000 PLI. Still more specifically, the pressure is between about 650 and 900 PLI. In one embodiment, the pressure applied is about 750 PLI.

To improve the pressure bond created between the foil 202 and the film 204, one or both of the rollers 210 and 215 are heated. In one process in accordance with the present invention, the roller 215 is heated to about 100 degrees Celsius. In another process in accordance with the invention, the roller 215 is heated to a temperature between about 100 and 300 degrees Celsius.

The speed with which the foil 202 and the film 204 move through the calender 205 is also controlled. In one process in accordance with the present invention, the calender rollers are about 4 inches in diameter, and make about 1 revolution per minute. In another process, the rollers turn to cause the composite sheet 225 to be produced at the output of the calender 225 at the rate of about 3 meters per minute.

The composite sheet 225 is then cut or otherwise shaped into composite electrodes in accordance with the present invention, such as the electrode 100 of FIG. 1, and terminals are attached to the current collectors of the electrodes.

Figure 3:
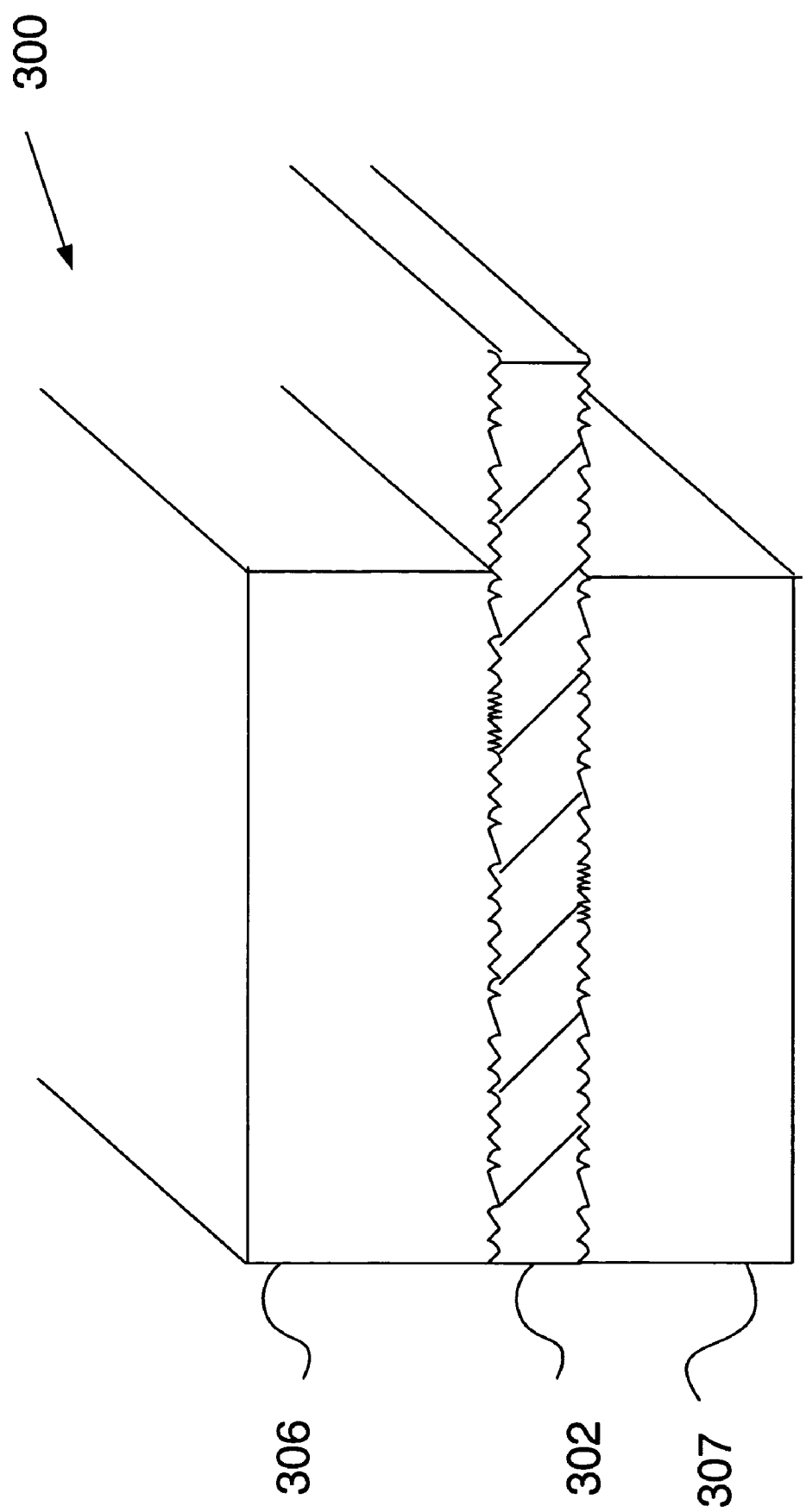
FIG. 3 is a high-level cross-sectional view of an electrode with two film layers of active electrode material pressure-bonded to a current collector.

FIG. 3 illustrates an electrode 300 with a current collector 302 sandwiched between a first film of active electrode material 306 and a second film of active electrode material 307. These films are similar in construction to the films 104 and 204, shown in FIGS. 1 and 2, respectively. Again, adhesive is not used to bond the films 306 and 307 to the current collector 302. Instead, both surfaces of the current collector 302 are roughed, subjected to an activation treatment, and then pressure-bonded to the films 306 and 307 using a high-pressure and high-temperature nip, such as a calender.

Figure 4:
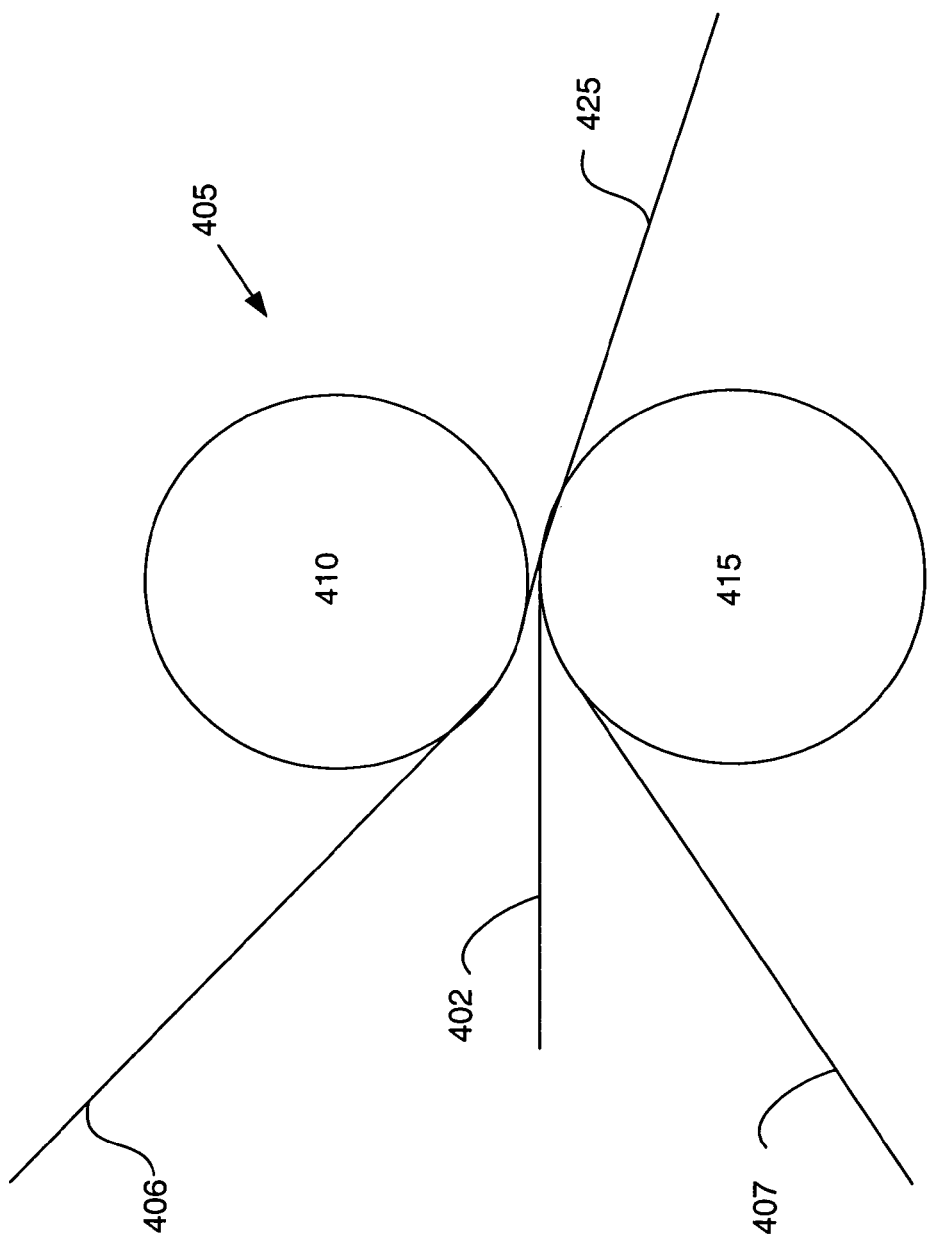
FIG. 4 illustrates selected steps of a process used for pressure-bonding the electrode of FIG. 3.

FIG. 4 illustrates the process of pressure-bonding film sheets of active electrode material 406 and 407 onto opposite sides of an aluminum foil sheet 402. The thickness of each film sheet 406 and 407 is about 180 microns, while the current collector 402 has a thickness of about 30 microns and is chemically pitted on both sides to a depth not exceeding about 10 microns. In certain embodiments in accordance with the invention, the thickness of the film sheets varies between about 80 and 350 microns. After the pressure-bonding process, the thickness of the films 406 and 407 is reduced by between about 5 and about 20 percent. In some processes in accordance with the present invention, the thickness of the films 406 and 407 is reduced by between about 8 and about 15 percent. The pressure-bonding process employs a calender 405 and results in a composite layer 425, which can be cut or otherwise shaped into electrodes, such as the electrode 300 of FIG. 3.

The calender 405 includes rollers 410 and 415. Both rollers are heated to enhance the pressure-bonding of the films 406 and 407 to the current collector 402. In the calender 405, the feed rates of the sheets 402, 406, and 407 range up to about 3 meters per minute, although a person skilled in the art would recognize that higher feed rates are possible, depending on the materials used, temperatures of the rollers 410 and 415, thicknesses of the film sheets 406 and 407, pressure applied by the calender, required adhesion strength, and a host of other factors.

Composite electrodes in accordance with the present invention can thus be used in many different applications, including double layer capacitors.

This document describes the inventive composite electrodes and processes used in the course of their fabrication in considerable detail for illustration purposes only. Neither the specific embodiments of the invention as a whole, nor those of its features limit the general principles underlying the invention. In particular, the invention is not limited to the specific materials used for fabricating the electrodes; and pressure-bonding of the inventive electrodes is not limited to the use of calenders, but includes various pressure devices. The invention is also not limited to uses in double layer capacitors, but extends to other electrode applications, for example, batteries, and fuels cells. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their legal equivalents.

The invention claimed is:

1. An electrode comprising:
a current collector comprising a first surface and a second surface, and
a first film of active electrode material, the first film comprising dry fibrillized carbon and binder particles, the first film comprising a third surface adjacent to the first surface of the current collector, the third surface of the first film being attached directly to the first surface of the current collector substantially without use of an adhesive layer between the first and the third surfaces.

2. An electrode in accordance with claim 1, wherein the current collector comprises a conductive material.

3. An electrode in accordance with claim 2, wherein a volumetric porosity surface factor of the first film of active electrode material is about $7.5*10^7$ m.$^{-1}$ or greater.

4. An electrode in accordance with claim 2, wherein a volumetric macroporosity of the first film of active electrode material is between about 40 percent and about 80 percent.

5. An electrode in accordance with claim 2, wherein a majority of pores in the first film of active electrode material range in size between about 1 and about 3 cubic micrometers.

6. An electrode in accordance with claim 2, wherein the first surface of the current collector is treated with active plasma to promote adhesion between the first surface of the current collector and the third surface of the first film.

7. An electrode in accordance with claim 2, wherein the first surface of the current collector is mechanically roughed to cause the first surface to be uneven.

8. An electrode in accordance with claim 1, wherein the first surface comprises portions defining protrusions, wherein a majority of the protrusions range in area between about 0.5 and about 5 square micrometers as measured at 0.5 micrometer elevation from an average level of the first surface.

9. An electrode in accordance with claim 8, wherein a plurality of protrusions penetrate pores at the third surface of the first film, causing the first surface of the current collector to adhere to the third surface of the first film.

10. An electrode in accordance with claim 1, wherein the first surface of the current collector comprises portions defining pits, wherein a majority of the pits range in surface area between about 0.5 and about 8 square micrometers, a surface area of each pit being measured at average level of the first surface.

11. An electrode in accordance with claim 1, wherein the first surface of the current collector is chemically pitted.

12. An electrode in accordance with claim 1, wherein the first surface of the current collector is corona treated to promote adhesion between the first surface of the current collector and the third surface of the first film.

* * * * *